United States Patent [19]
Sedlack

[11] Patent Number: 5,580,126
[45] Date of Patent: Dec. 3, 1996

[54] FIVE-POINT BOOSTER CAR SEAT BELT SYSTEM

[75] Inventor: Mark A. Sedlack, Cuyahoga Falls, Ohio

[73] Assignee: Century Products Company, Macedonia, Ohio

[21] Appl. No.: 334,728

[22] Filed: Nov. 4, 1994

[51] Int. Cl.$^6$ .................................................. A47C 1/08
[52] U.S. Cl. ................................ 297/256.15; 297/250.1; 297/467
[58] Field of Search ........................... 297/256.15, 250.1, 297/467, 468, 469, 484, 486, 487

[56] References Cited

U.S. PATENT DOCUMENTS

| | | | |
|---|---|---|---|
| 4,033,622 | 7/1977 | Boudreau | 297/467 X |
| 5,039,169 | 8/1991 | Bougher et al. | 297/484 |
| 5,098,161 | 3/1992 | Minami et al. | 297/467 X |
| 5,224,756 | 7/1993 | Dukatz et al. | 297/467 X |
| 5,282,667 | 2/1994 | Elton et al. | 297/467 X |
| 5,380,067 | 1/1995 | Turvill et al. | 297/468 X |

FOREIGN PATENT DOCUMENTS

| | | | |
|---|---|---|---|
| 251242 | 1/1988 | European Pat. Off. | 297/250.1 |
| 6-286511 | 10/1994 | Japan | 297/256.15 |
| 2277863 | 11/1994 | United Kingdom | 297/250.1 |

*Primary Examiner*—Laurie K. Cranmer
*Attorney, Agent, or Firm*—Graham & James LLP

[57] ABSTRACT

An improved seat belt for a child car booster seat, having a novel five-point seat belt harness with a belt adjusting mechanism. A novel belt tightening and loosening mechanism is disclosed. The booster seat may be secured preferably by one of two ways: either employing belts that secure the booster seat from the rear, or employing a traditional automobile shoulder and lap belt harness to secure both the user and the booster seat. When using an automobile shoulder and lap belt harness mode of securing the booster seat, a shoulder belt clasp is employed to keep the shoulder belt away from the child user's face and neck.

6 Claims, 2 Drawing Sheets

FIVE-POINT BOOSTER CAR SEAT BELT SYSTEM

BACKGROUND OF THE INVENTION

This invention relates to an improved five-point booster car seat belt system.

SUMMARY OF THE INVENTION

The present invention is intended to provide an improved five-point booster car seat belt system.

The booster seat has the novel feature of using a five point harness system with an added shield having a unique two-piece configuration intended for use with children in the 30–45 pound range.

An additional alternative securing means, a shoulder belt clasp, allows children of up to about 60 pounds to be secured, when used in combination with a conventional vehicle lap/shoulder belt.

DETAILED DESCRIPTION OF THE PREFERRED EMBODIMENTS

Figure 1:
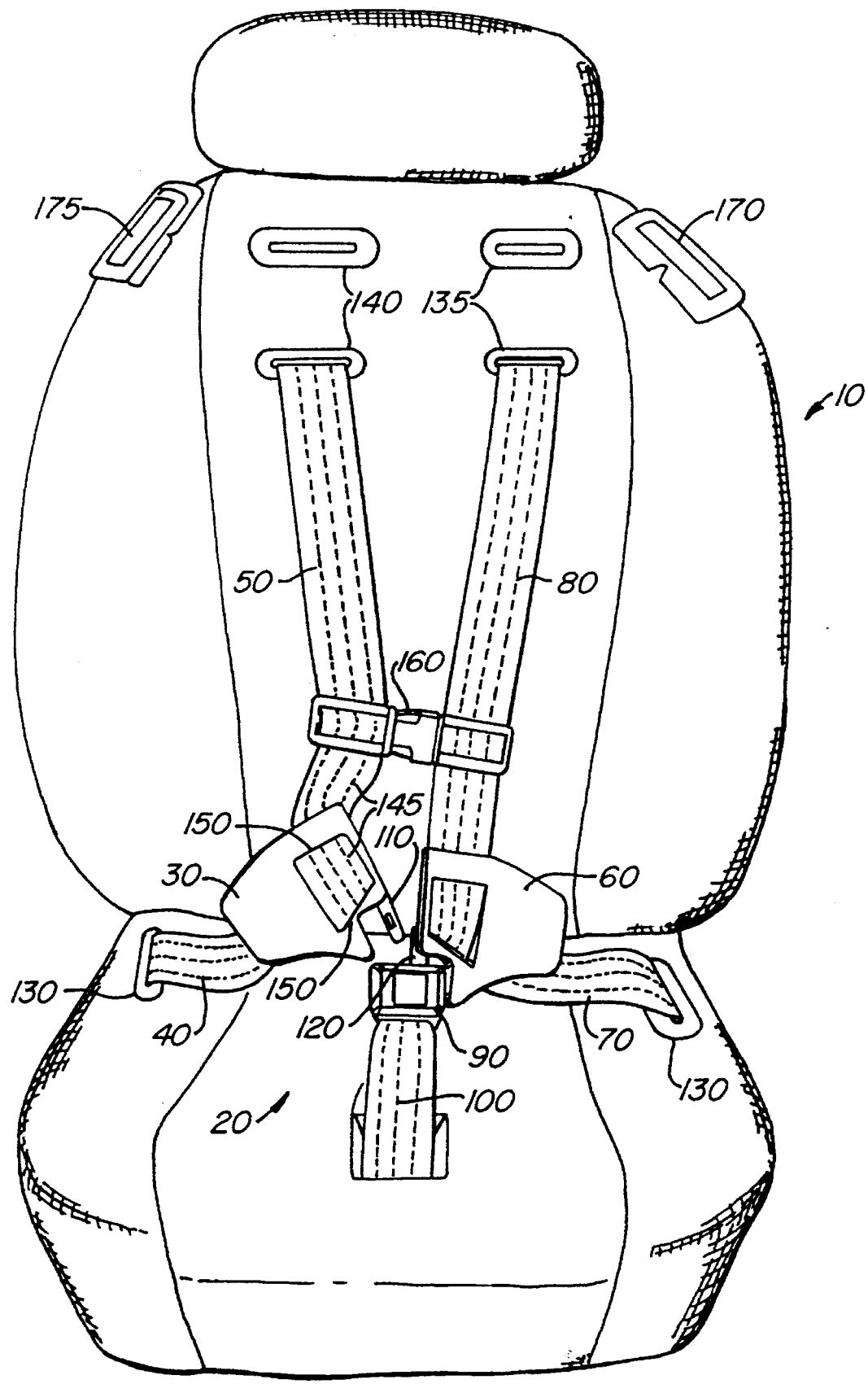
FIG. 1 shows a front plan view of a booster car seat with the improved five point safety belt system.

Referring to the figures, there is shown a child booster car seat 10, such as is known in the art per se, that allows a child to sit higher in an automobile seat. The booster seat 10 has a five point seat belt harness 20, having a fastening mechanism having five points of contact as shown in FIG. 1, including a right-hand side (RHS) shield half 30 with tongue 110, which receives a lateral web belt 40, and a longitudinal (shoulder) web belt 50, a left hand side (LHS) shield half 60 with tongue 120, receiving a lateral web or belt 70 and a longitudinal (shoulder) web 80, and a crotch buckle 90, anchored to the bottom of the seat by a crotch web or belt 100. Shoulder belts 50, 80 are anchored to the booster seat at the top of the seat, along the back of the booster seat. The belts 50, 80 may be tightened at the back of the seat in the manner suggested by FIG. 2, described below. Crotch buckle 90 receives tongues 110 and 120 from RHS shield half 30 and LHS shield half 60. The webs may be guided by guide opening grommets 130, to where the webs are secured to the back and underside of the booster seat. A plurality of pairs of grommets 135, 140 may be provided to allow for a plurality of different heights to be accommodated.

The booster seat itself is secured to a car seat in either one of two preferred ways. For smaller children of between generally the 30–45 pound range, the booster seat may be secured to an automobile seat by passing an automobile seat belt of the lap belt variety through a plurality of holes found at the back of the booster seat.

Alternatively, for larger children of generally up to 60 pounds, the booster seat may be secured to an automobile seat by engaging the booster seat (and child sitting therein) with the shoulder and lap belt harness of an automobile seat belt. In this configuration, the automobile shoulder belt would be passed through or slip under either one of the two clips 170 or 175 (depending on whether the child is sitting on the right hand or left hand passenger side of the automobile). In this way the clips would adjust the angle of inclination of the shoulder belt so that it would not be in contact with the face and neck of the child seated in the booster seat, but rather over the child's shoulder.

A single belt 145 may be passed through slot openings 150 in the oval portions of tongue buckles 30, 60, sized to receive the belt, as shown in FIG. 1. The curved, generally ovular shaped lower surfaces of the RHS and LHS buckles 30, 60 act as supplemental restraints for the pelvis of a child. A two-piece locking lateral fastener 160 may be employed on longitudinal belts 50, 80. A pair of alternative securing means, shoulder belt clasps 170, 175, are used in conjunction with conventional vehicle lap/shoulder belts to secure a larger sized child than can be secured by the five point seat belt harness 20. In general, though not limited to this, the five-point seat belt harness 20 is for a child in the 30–45 pound range, while the alternative securing means are for children up to 60 pounds.

Figure 3:
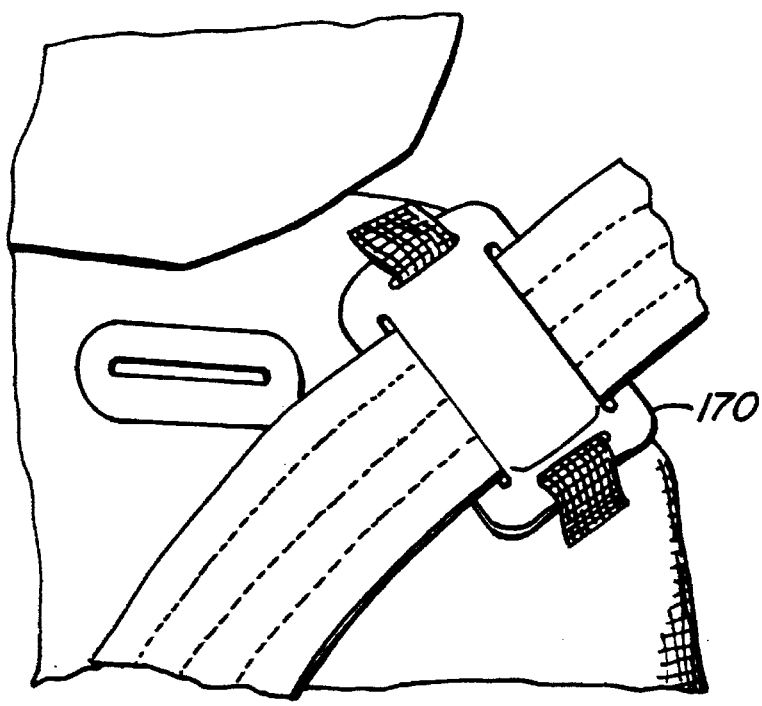
FIG. 3 shows a closeup of the alternative securing means, a shoulder belt clasp used in conjunction with conventional vehicle lap/shoulder belts.

Thus, turning attention now to FIG. 3, there is shown the alternate securing means for the present invention, comprising a pair of shoulder belt clasps, through which pass conventional automobile shoulder belts that may be used to secure a heavier sized child when the booster seat is used in conjunction with a conventional automobile shoulder and lap belts harness.

Figure 2:
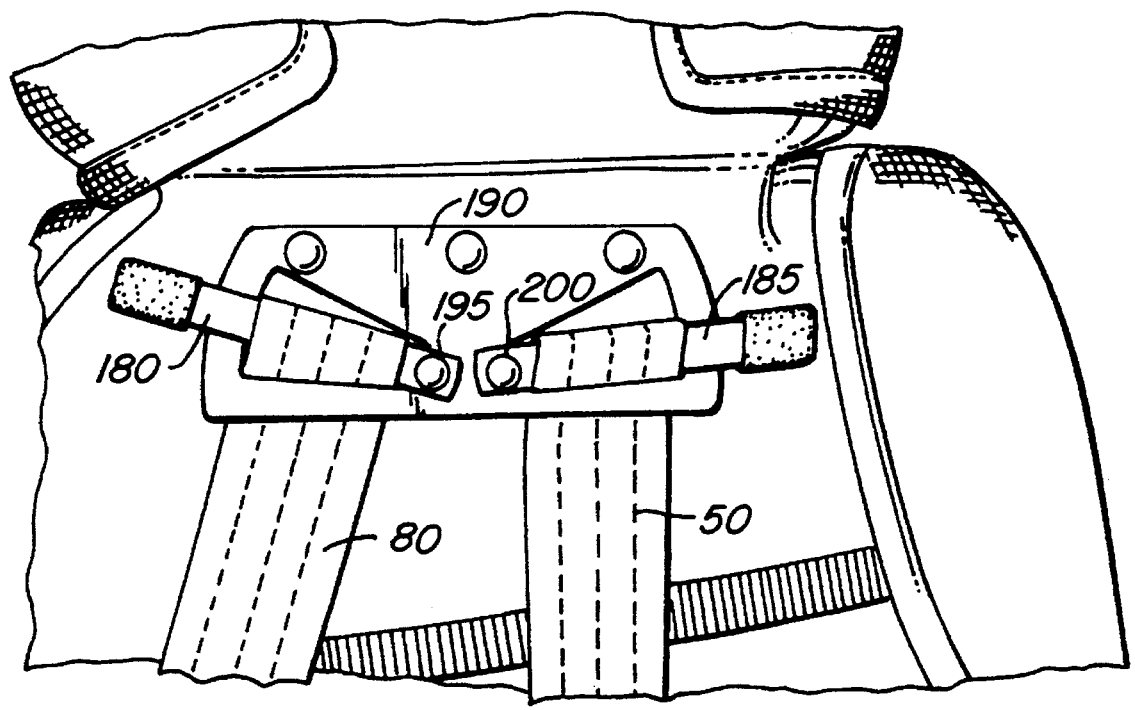
FIG. 2 shows a back view of the FIG. 1 embodiment, showing a shoulder belt tightening mechanism.

FIG. 2 shows the web tightening mechanism or belt adjuster for the five-point seat belt harness 20, which is found on the back of the booster car seat. A plurality of levers 180, 185 are engaged to a stamping bracket 190, and pivoted at pivots 195, 200. These levers are used to tighten lateral belts 50, 80, which wrap around the levers and are frictionally engaged thereby, as shown in FIG. 2. Lever 180 and stamping 190 cooperate to receive one of the two lateral belts 50, 80, which are threaded through the seat back, between stamping bracket 190 and the seat back, through an opening in stamping 190, over the lever, and back through the opening in stamping 190 as shown. To tighten the shoulder belts, one simply pulls the loose end of shoulder belts 50, 80. To loosen the belts, one pushes either lever associated with a belt, such as levers 180, 185, upwards.

The foregoing description is offered for illustrative purposes only. Numerous modifications and variations may be readily apparent to those skilled in the art, while still falling within the spirit and scope of the invention as claimed herein below.

What is claimed is:

1. A vehicle booster seat belt system comprising:

a booster seat;

a five point seat belt harness on said seat, said five-point harness having two shield halves, a right hand side shield half and a left hand side shield half, each of said shield halves having a tongue and each said shield half connected to a belt, and a crotch buckle receiving both of said tongues from said two shield halves; said belts for said shield halves including a generally longitudinally extending shoulder belt and a generally laterally extending lap belt, said longitudinally extending shoulder belt attached to said booster seat at the back of said booster seat, and a tightening and securing mechanism for tightening said belts, said mechanism comprising a stamping plate lying substantially in a single plane and attached to said seat back of said booster seat, and a lever pivotally attached to said stamping plate for motion in a plane substantially parallel to the plane of said stamping plate wherein one of said longitudinally extending shoulder belts wrap around said lever wherein pulling on said belts tightens the seat belts, and moving said lever loosens said seat belts.

2. The booster seat belt system of claim 1 further comprising:

a clip attached to a top shoulder of said booster seat, said clip restraining an automobile safety shoulder belt to change the angle of inclination of said automobile safety shoulder belt, wherein said automobile safety belt may be disposed at an angle of inclination about a child using said booster seat and not interfere with the child's face and neck.

3. A five-point seat belt system for a seat comprising:

a seat having a seat base and a seat back;

a fastening device comprising a pair of shield halves having tongues received by a buckle;

said pair of shield halves each attached to a belt, said belt having a generally vertically extending longitudinal belt portion and a generally laterally extending lateral belt portion, said pair of shield halves have a portion enlarged in a generally oval shape and having a plurality of slots therein to allow a belt to pass through said slots, said oval shaped shield halves being sufficiently large to act as supplemental restraints for the pelvis of a child using said booster seat;

said lateral belt and longitudinal belt portions of said belt associated with each of said shield halves being a single belt, said single belt passing through said slots in said shield halves, and an end of said single belt detachably secured to the back of said seat back;

said buckle fixed to a web that is attached to said seat base; and a tightening and securing mechanism for tightening said single belts, said mechanism comprising a stamping plate lying substantially in a single plane and attached to said seat back of said booster seat, and a lever pivotally attached to said stamping plate for motion in a plane substantially parallel to the plane of said stamping plate wherein said one of said single belts wraps around said lever, wherein pulling on said belt end tightens the single seat belt, and moving said lever loosens said single seat belt.

4. The five-point seat belt system according to claim 3, wherein:

said seat is a child booster seat, and said booster seat is configured to be secured to an automobile seat.

5. The five-point seat belt system according to claim 4, wherein:

said booster seat is secured to said automobile seat though an automobile shoulder belt, and said seat belt system further comprising a clip attached to a top shoulder of said booster seat, said clip restraining said automobile safety shoulder belt to change the angle of inclination of said automobile safety shoulder belt, wherein said automobile safety belt may be disposed at an angle of inclination about a child using said booster seat and not interfere with the child's face and neck.

6. The five point seat belt system according to claim 3, further comprising:

a connector connecting said vertically extending longitudinal belt portions of said belts.

* * * * *